(12) United States Patent
Tsai et al.

(10) Patent No.: US 10,997,353 B2
(45) Date of Patent: May 4, 2021

(54) INTEGRATED CIRCUIT DESIGN METHOD AND NON-TRANSITORY COMPUTER READABLE MEDIUM THEREOF

(71) Applicant: Realtek Semiconductor Corporation, Hsinchu (TW)

(72) Inventors: I-Ching Tsai, Hsinchu (TW); Li-Yi Lin, Changhua County (TW); Yun-Chih Chang, Zhubei (TW); Shu-Yi Kao, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/885,750

(22) Filed: May 28, 2020

(65) Prior Publication Data
US 2021/0004516 A1 Jan. 7, 2021

(30) Foreign Application Priority Data
Jun. 6, 2019 (TW) .................. 108119828

(51) Int. Cl.
*G06F 30/394* (2020.01)
*G06F 30/396* (2020.01)
*G06F 119/06* (2020.01)

(52) U.S. Cl.
CPC .......... *G06F 30/394* (2020.01); *G06F 30/396* (2020.01); *G06F 2119/06* (2020.01)

(58) Field of Classification Search
USPC ........................................................ 716/126
See application file for complete search history.

(56) References Cited

U.S. PATENT DOCUMENTS

| 5,212,651 | A | 5/1993 | Yabe |
| 5,307,286 | A | 4/1994 | Rusu et al. |
| 6,539,509 | B1 | 3/2003 | Teene |
| 2009/0113230 | A1* | 4/2009 | Ito .................. G01R 31/318552 713/500 |
| 2012/0242368 | A1* | 9/2012 | Nozuyama .............. G06F 30/30 326/16 |
| 2014/0103959 | A1* | 4/2014 | Andreev ........ H03K 19/018585 326/41 |
| 2018/0341724 | A1* | 11/2018 | Sugahara ............ G06F 30/3312 |
| 2021/0004516 | A1* | 1/2021 | Tsai ...................... G06F 30/396 |

* cited by examiner

*Primary Examiner* — Mohammed Alam
(74) *Attorney, Agent, or Firm* — Locke Lord LLP; Tim Tingkang Xia, Esq.

(57) ABSTRACT

An IC design method is provided that includes steps outlined below. A clock tree structure is retrieved from an IC design file. A branch level number of a branch that each of clock units in the clock tree structure locates is determined. A common branch level number of a common branch that closest to each two of the flip-flops is determined. A scan chain structure is retrieved from the IC design file. A wire distance and a clock skew of each two of the flip-flops are determined. A cost is calculated according to the common branch number, the wire distance and the clock skew. An initial point and a terminal point of the flip-flops in the scan chain structure are determined to further calculate a path having a minimum cost. The order of the scan chain structure of the IC design file is updated.

10 Claims, 4 Drawing Sheets

INTEGRATED CIRCUIT DESIGN METHOD AND NON-TRANSITORY COMPUTER READABLE MEDIUM THEREOF

RELATED APPLICATIONS

This application claims priority to Taiwan Application Serial Number 108119828, filed Jun. 6, 2019, which is herein incorporated by reference.

BACKGROUND

Field of Disclosure

The present disclosure relates to an IC design technology. More particularly, the present disclosure relates to an IC design method and a non-transitory computer readable medium thereof.

Description of Related Art

In IC design flow, a scan chain could be employed to observe and control the circuit test. However, when the order of the components, e.g. flip-flops, in the scan chain is not ideal, the routing may not be accomplished or the issue of timing violation may occur. Along with the progress of the semiconductor manufacturing process, the effect on the timing of the chip due to phenomenon of on-chip variation (OCV) that includes process variation, voltage variation and temperature variation cannot be neglected. The issue of hold time violation generated due to the on-chip variation becomes severe as well. Further, the condition that the order of the flip-flops in the scan chain is not ideal may increase the area cost and the duration of the timing closure such that schedule of tape-out may be delayed.

Accordingly, what is needed is an IC design method and a non-transitory computer readable medium thereof to address the above issues.

SUMMARY

An aspect of the present disclosure is to provide an integrated circuit (IC) design method that includes the steps outlined below. A clock tree structure including a plurality of flip-flops and a plurality of clock units is retrieved from an IC design file. By using the flip-flops as starting points, a branch level number of a branch that each of the clock units in the clock tree structure locates relative to the flip-flops is determined. The branch level number of a common branch that closest to each two of the flip-flops is calculated as a common branch level number. A scan chain structure of the flip-flops is retrieved from the IC design file. A wire distance and a clock skew of each two of the flip-flops are determined according to the scan chain structure. A cost of each two of the flip-flops is calculated according to the common branch number, the wire distance and the clock skew of each two of the flip-flops. An initial point and a terminal point of the flip-flops in the scan chain structure are determined according to the scan chain structure to further calculate a path having a minimum cost of the flip-flops from the initial point to the terminal point according to the cost. A connection order of the scan chain structure of the IC design file is updated according to the path.

Another aspect of the present disclosure is to provide a non-transitory computer readable medium that includes a plurality of computer readable commands, wherein the computer readable commands are executed by a processor of a computer system to execute an IC design method. The IC design method includes the steps outlined below. A clock tree structure including a plurality of flip-flops and a plurality of clock units is retrieved from an IC design file. By using the flip-flops as starting points, a branch level number of a branch that each of the clock units in the clock tree structure locates relative to the flip-flops is determined. The branch level number of a common branch that closest to each two of the flip-flops is calculated as a common branch level number. A scan chain structure of the flip-flops is retrieved from the IC design file. A wire distance and a clock skew of each two of the flip-flops are determined according to the scan chain structure. A cost of each two of the flip-flops is calculated according to the common branch number, the wire distance and the clock skew of each two of the flip-flops. An initial point and a terminal point of the flip-flops in the scan chain structure are determined according to the scan chain structure to further calculate a path having a minimum cost of the flip-flops from the initial point to the terminal point according to the cost. A connection order of the scan chain structure of the IC design file is updated according to the path.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
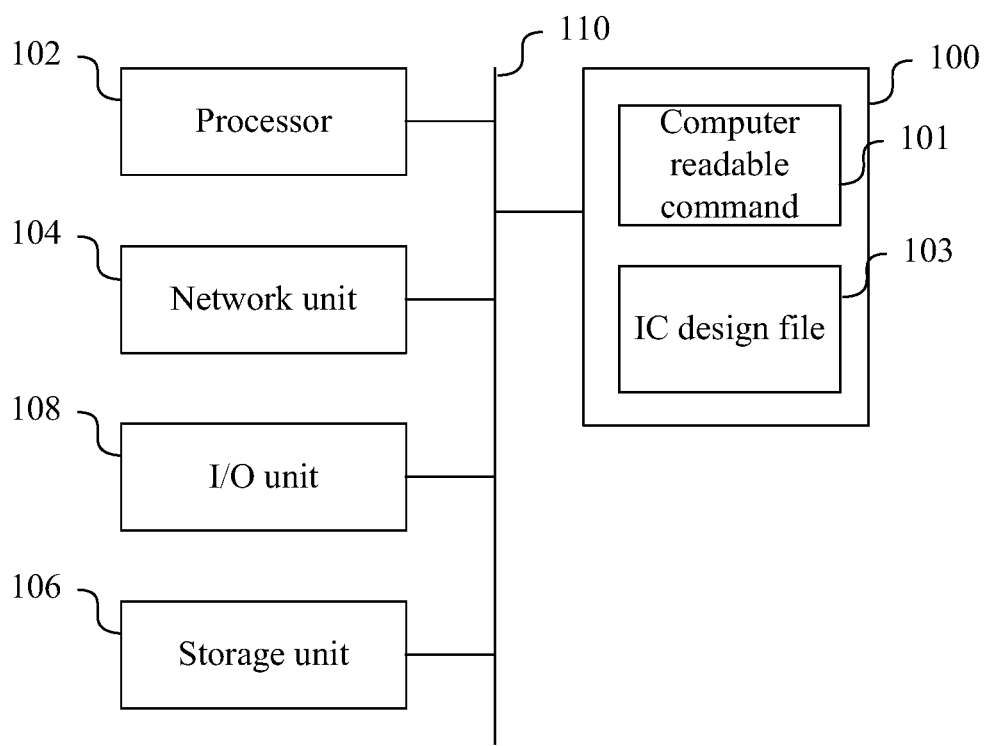
FIG. 1 is a block diagram of an IC design apparatus in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of an IC design apparatus 1 in an embodiment of the present invention. The IC design apparatus 1 includes a memory 100, a processor 102, a network unit 104, a storage unit 106 and an I/O unit 108. The components described above can perform communication with each other by using such as, but not limited to a bus 110.

The memory 100 can be any storage device that is used to store data, such as but not limited to a random access memory (RAM), a read only memory (ROM), a flash memory, a hard disk or other storage device used to store data. The memory 100 is configured to at least store a plurality of computer readable commands 101. In an embodiment, the memory 100 can also be used to store temporary data generated by the processor 102 during operation.

The processor 102 is electrically coupled to the memory 100 and is configured to access the computer readable commands 101 from the memory 100 to control the components in the IC design apparatus 1 to execute the function of the IC design apparatus 1.

The network unit 104 is configured to access network under the control of the processor 102. The storage unit 106 can be such as, but not limited to a hard disk or an optical disk to store data or command under the control of the processor 102. The I/O unit 108 can be controlled to communicate with the processor 102 by a user to input and output data.

Figure 2:
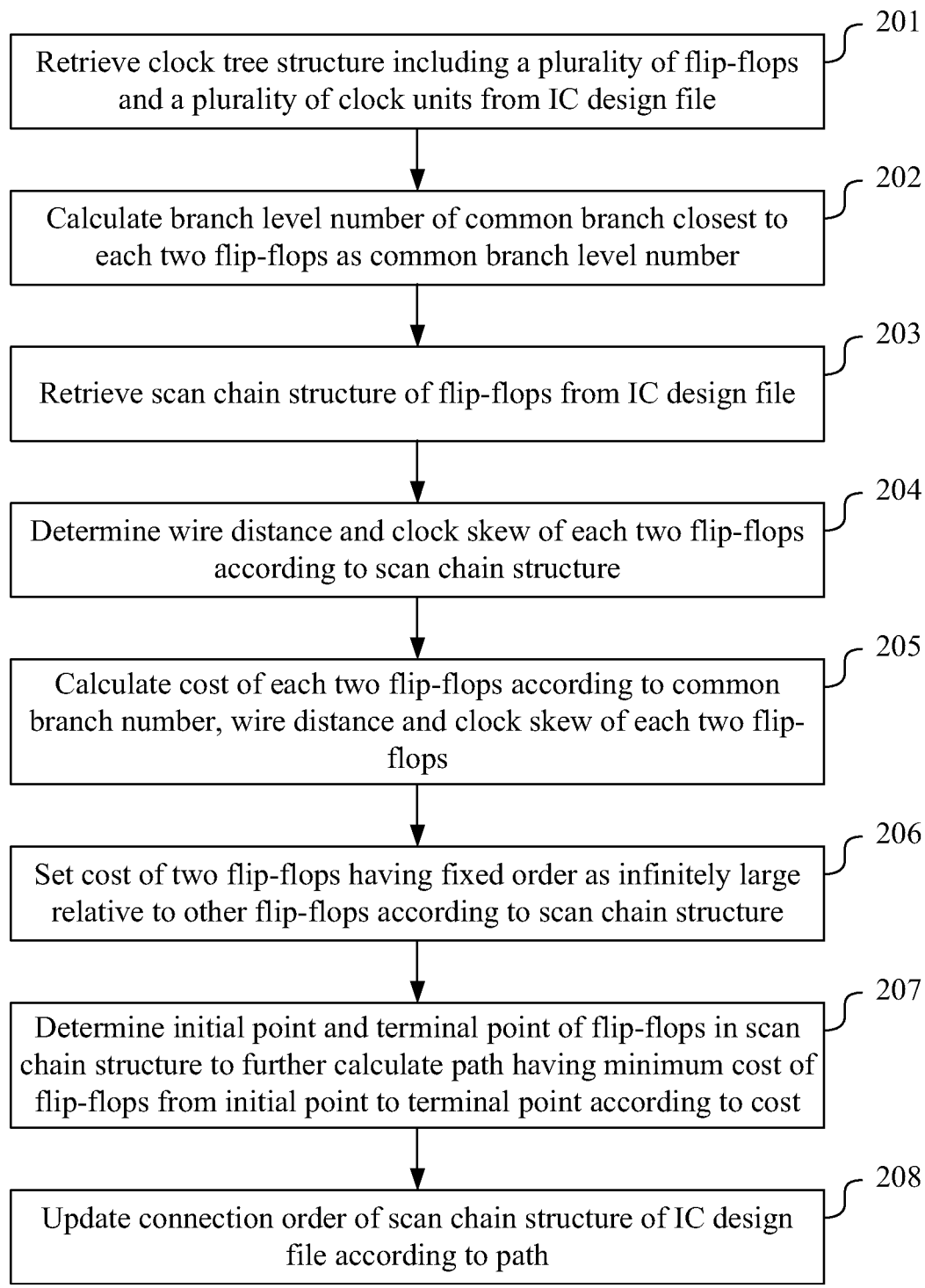
FIG. 2 is a flow chart of an IC design method in an embodiment of the present invention.

Reference is now made to FIG. 2. FIG. 2 is a flow chart of an IC design method 200 in an embodiment of the present invention. The IC design method 200 can be used in the IC design apparatus 1 illustrated in FIG. 1. More specifically, for the IC design apparatus 1, the IC design method 200 can be executed when the processor 102 retrieves the computer readable commands 101 in memory 100.

The IC design method 200 includes the steps outlined below (The operations are not recited in the sequence in which the operations are performed. That is, unless the sequence of the operations is expressly indicated, the sequence of the operations is interchangeable, and all or part of the steps may be simultaneously, partially simultaneously, or sequentially performed).

In step 201, a clock tree structure including a plurality of flip-flops and a plurality of clock units is retrieved from an IC design file 103.

In an embodiment, the IC design file 103 can be stored in such as, but not limited to the memory 100 and can be retrieved by the processor 102. The IC design file 103 includes the design data of a plurality of different circuit components. The circuit components may include a plurality of flip-flops and a plurality of clock units that form a scan chain.

Figure 3:
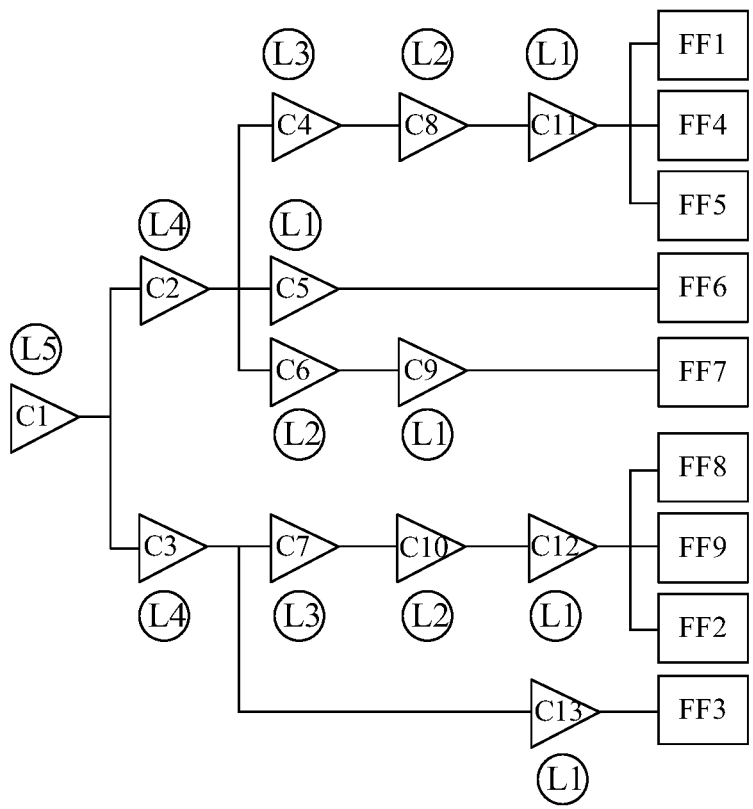
FIG. 3 is a clock tree structure that includes a plurality of flip-flops and a plurality of clock units in an embodiment of the present invention.

Reference is now made to FIG. 3. FIG. 3 is a clock tree structure 300 that includes a plurality of flip-flops FF1-FF9 and a plurality of clock units C1-C13 in an embodiment of the present invention.

As illustrated in FIG. 3, the clock tree structure 300 includes a root node formed by the clock unit C1, a plurality of branch nodes branched from the clock unit C1 that include the clock units C2-C13 and a plurality of leaf nodes formed by the flip-flops FF1-FF9. The clock unit C1 that serves as the root node is the source of the clock signal to deliver the clock signal. The clock signal is further transmitted through the clock units C2-C13 that serve as the branch nodes to the flip-flops FF1-FF9 that serve as the leaf nodes such that the delay and the clock skew between each two of the flip-flops FF1-FF9 is preferably lowered.

It is appreciated that the configuration and the number of the flip-flops and the clock units in the clock tree structure 300 illustrated in FIG. 3 are merely an example. In other embodiments, the configuration and the number of the flip-flops and the clock units can be different depending on practical requirements.

By using the flip-flops FF1-FF9 as starting points, a branch level number of a branch that each of the clock units C1-C13 in the clock tree structure 300 locates relative to the flip-flops FF1-FF9 is determined.

In an embodiment, the clock units closest to the flip-flops FF1-FF9, e.g. the clock units C11, C5, C9, C12 and C13, belong to the first branch level (labeled as L1). The clock units that are farther, e.g. C8, C6 and C10, belong to the second branch level (labeled as L2). The clock units that are even farther, e.g. the clock units C4 and C7, belong to the third branch level (labeled as L3).

In the rest of the branches, the clock units that are relatively closer to the flip-flops FF1-FF9, e.g. C2 and C3, belong to the fourth branch level (labeled as L4). Subsequently, in the next level of branches, only the clock unit C1 that serves as the root node exists, which belongs to the fifth branch level (labeled as L5).

In step 202, the branch level number of a common branch that closest to each two of the flip-flops FF1-FF9 is calculated as a common branch level number.

Reference is now made to table 1. Table 1 is the common branch level number of each two of the flip-flops FF1-FF9 in an embodiment of the present invention.

TABLE 1

|     | FF1 | FF2 | FF3 | FF4 | FF5 | FF6 | FF7 | FF8 | FF9 |
| --- | --- | --- | --- | --- | --- | --- | --- | --- | --- |
| FF1 |     |     |     |     |     |     |     |     |     |
| FF2 | 5   |     |     |     |     |     |     |     |     |
| FF3 | 5   | 4   |     |     |     |     |     |     |     |
| FF4 | 1   | 5   | 5   |     |     |     |     |     |     |
| FF5 | 1   | 5   | 5   | 1   |     |     |     |     |     |
| FF6 | 4   | 5   | 5   | 4   | 4   |     |     |     |     |
| FF7 | 4   | 5   | 5   | 4   | 4   | 4   |     |     |     |
| FF8 | 5   | 1   | 4   | 5   | 5   | 5   | 5   |     |     |
| FF9 | 5   | 1   | 4   | 5   | 5   | 5   | 5   | 1   |     |

Taking the flip-flops FF1 and FF2 as an example, the common branch that closest to the flip-flops FF1 and FF2 is the branch that the clock unit C1 locates. In an embodiment, as illustrated in Table 1, the branch level number of the clock unit that closest to the flip-flops FF1 and FF2 is used as the common branch level number. Since the clock unit C1 is at the fifth branch level, the common branch level number is 5.

Taking the flip-flops FF1 and FF4 as an example, the common branch that closest to the flip-flops FF1 and FF4 is the branch that the clock units C4, C8 and C11 locate. As illustrated in Table 1, the branch level number of the clock unit that closest to the flip-flops FF1 and FF4, i.e. C11, is used as the common branch level number, which is 1.

Taking the flip-flops FF1 and FF7 as an example, the common branch that closest to the flip-flops FF1 and FF7 is the branch that the clock unit C2 locates. As illustrated in Table 1, the branch level number of the clock unit that closest to the flip-flops FF1 and FF7, i.e. C2, is used as the common branch level number, which is 4.

As a result, the common branch level number of each two of the flip-flops FF1-FF9 in Table 1 can be calculated by using the method described above in step 202.

It is appreciated that in another embodiment, the level number of the clock units that has no branch therebetween can be simplified to define the common branch level number. Taking the flip-flops FF1 and FF2 as an example, the clock units C4, C8 and C11 can be simplified as a single level and the clock units C7, C10 and C12 can be simplified as a single level. Under such a condition, the branch that the clock unit C1 closest to the flip-flops FF1 and FF2 locates is the third level. Accordingly, the common branch level number can be assigned as 3. The present invention is not limited thereto.

In step 203, a scan chain structure of the flip-flops FF1-FF9 is retrieved from the IC design file 103.

Figure 4:
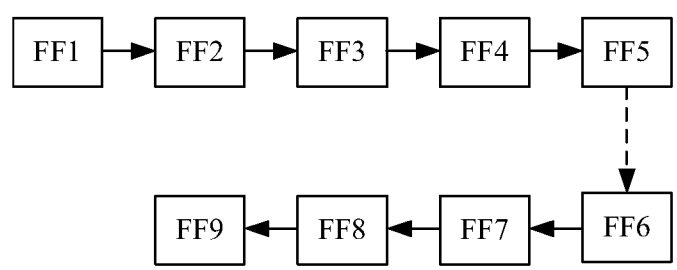
FIG. 4 is a diagram of a scan chain structure that includes the flip-flops in an embodiment of the present invention.

Reference is now made to FIG. 4. FIG. 4 is a diagram of a scan chain structure 400 that includes the flip-flops FF1-FF9 in an embodiment of the present invention.

As illustrated in FIG. 4, the flip-flops FF1-FF9 are arranged in the order from the flip-flop FF1, the flip-flop FF2, . . . , the flip-flop FF8 to the flip-flop FF9. As a result, the initial point is the flip-flop FF1 and the terminal point is the flip-flop FF9. In the present embodiment, the order of the flip-flop FF5 and the flip-flop FF6 is fixed and cannot be re-arranged, and the connection relation therebetween is illustrated by using a dashed line in FIG. 4.

In step 204, a wire distance and a clock skew of each two of the flip-flops FF1-FF9 are determined according to the scan chain structure 400.

In an embodiment, since the wire can only be arranged in a first direction and a second direction perpendicular to each other, the wire distance between each two of the flip-flops FF1-FF9 is the Manhattan distance. Further, the clock skew of each two of the flip-flops FF1-FF9 can be different due to the different distance and the different amount of coupling effect.

In step 205, a cost of each two of the flip-flops FF1-FF9 is calculated according to the common branch number, the wire distance and the clock skew of each two of the flip-flops FF1-FF9.

In an embodiment, the cost function used to calculate the cost sums up the parameters include the common branch number, the wire distance and the clock skew such that the sum serves as the cost.

In another embodiment, a plurality of weighting numbers each corresponding to the common branch number, the wire distance and the clock skew of each two of the flip-flops FF1-FF9 can be set such that a weighted sum of the common branch number, the wire distance and the clock skew of each two of the flip-flops FF1-FF9 is calculated to calculate the cost of each two of the flip-flops FF1-FF9.

As a result, when the cost of the flip-flops FFi-FFj is COST(i,j), the common branch number is C(i,j), the wire distance is D(i,j) and the clock skew is S(i,j), and the weighting numbers corresponding thereto are W1, W2 and W3, the cost function can be expressed as:

$$COST(i,j)=W1 \times C(i,j)+W2 \times D(j,j)+W3 \times S(i,j)$$

In step 206, the cost of the two of the flip-flops having the fixed order is set as infinitely large relative to the other flip-flops according to the scan chain structure 400.

In the embodiment described above, since the order of the flip-flops FF5 and the flip-flop FF6 is fixed, the cost of the flip-flops FF5 and the flip-flop FF6 is set to be infinitely large relative to the costs of the other flip-flops FF1-FF4 and FF7-FF9.

In step 207, an initial point and a terminal point of the flip-flops FF1-FF9 in the scan chain structure 400 are determined according to the scan chain structure 400 to further calculate a path having a minimum cost of the flip-flops FF1-FF9 from the initial point to the terminal point according to the cost.

Figure 5:
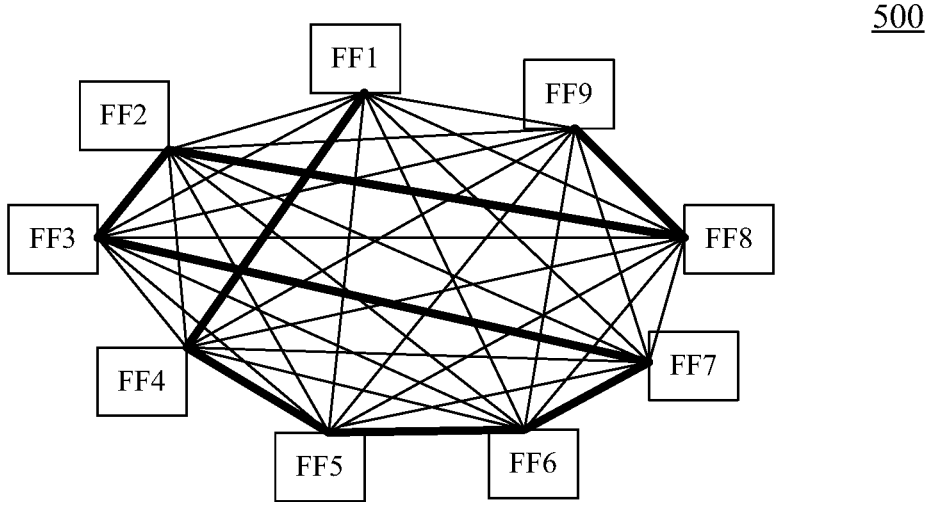
FIG. 5 is a diagram of a graph theory model formed by the flip-flops in an embodiment of the present invention.

Reference is now made to FIG. 5. FIG. 5 is a diagram of a graph theory model 500 formed by the flip-flops FF1-FF9 in an embodiment of the present invention.

In an embodiment, each of the flip-flops FF1-FF9 is disposed as one of a plurality of nodes of the graph theory model 500. The cost of each two of the flip-flops FF1-FF9 is disposed as a line between each two of the nodes. Subsequently, according to the graph theory model 500, a path having a minimum cost of the flip-flops FF1-FF9 from the initial point to the terminal point, e.g. from the flip-flop FF1 to the flip-flop FF9, can be calculated according to the cost.

In an embodiment, the path having the minimum cost is calculated by such as, but not limited to a travelling salesman problem (TSP) algorithm.

In step 208, a connection order of the scan chain structure 400 of the IC design file 103 is updated according to the path.

Figure 6:
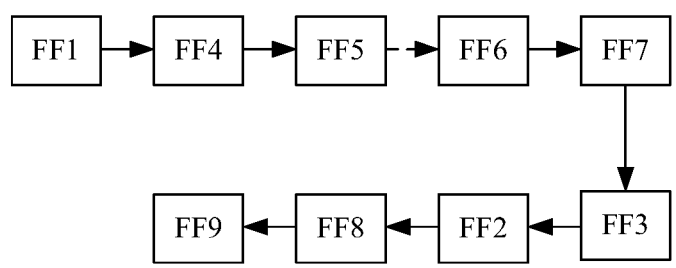
FIG. 6 is a diagram of an updated scan chain structure in an embodiment of the present invention.

Reference is now made to FIG. 6. FIG. 6 is a diagram of an updated scan chain structure 600 in an embodiment of the present invention.

In an embodiment, when the minimum cost calculated from the graph theory model 500 is represented as the path illustrated as a thick line in FIG. 5, the order of the flip-flops FF1-FF9 on such a path is arranged as the scan chain structure 600 illustrated in FIG. 6 that includes the flip-flop FF1, the flip-flop FF4, the flip-flop FF5, the flip-flop FF6, the flip-flop FF7, the flip-flop FF3, the flip-flop FF2, the flip-flop FF8 and the flip-flop FF9.

Furthermore, an integrated circuit can be manufactured according to the updated IC design file 103.

In an embodiment, the manufacturing of the integrated circuit can be performed by related equipment according to the IC design file 103. In an embodiment, the integrated circuit manufactured according to the IC design file 103 includes the flip-flops FF1-FF9 arranged in the order shown in FIG. 6.

As a result, the IC design method and the non-transitory computer readable medium can generate the cost of each two of the flip-flops according to the influence of the clock unit structure relative to the flip-flops in the clock tree, the wire distance between each two of the flip-flops and the clock skew between each two of the flip-flops, and the path having the minimum cost among the flip-flops can be determined. The order of the flip-flops can be re-arranged accordingly in a more effective way to decrease the area cost and the duration of the timing closure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An integrated circuit (IC) design method, comprising:
retrieving a clock tree structure comprising a plurality of flip-flops and a plurality of clock units from an IC design file;
using the flip-flops as starting points, determining a branch level number of a branch that each of the clock units in the clock tree locates relative to the flip-flops;
calculating the branch level number of a common branch that closest to each two of the flip-flops as a common branch level number;
retrieving a scan chain structure of the flip-flops from the IC design file;
determining a wire distance and a clock skew of each two of the flip-flops according to the scan chain structure;
calculating a cost of each two of the flip-flops according to the common branch number, the wire distance and the clock skew of each two of the flip-flops;
determining an initial point and a terminal point of the flip-flops in the scan chain structure according to the scan chain structure to further calculate a path having a minimum cost of the flip-flops from the initial point to the terminal point according to the cost of each two of the flip-flops; and updating a connection order of the scan chain structure of the IC design file according to the path.

2. The IC design method of claim 1, wherein the step of calculating the path having the minimum cost of the flip-flops further comprises:

disposing each of the flip-flops as one of a plurality of nodes of a graph theory model to set the cost of each two of the flip-flops as a line between each two of the nodes; and calculating the path having the minimum cost of the flip-flops from the initial point to the terminal point on the graph theory model.

3. The IC design method of claim 2, wherein the path having the minimum cost is calculated by a travelling salesman problem (TSP) algorithm.

4. The IC design method of claim 1, further comprising:

determining two of the flip-flops having a fixed order according to the scan chain structure; and setting the cost of the two of the flip-flops having the fixed order as infinitely large relative to the other flip-flops.

5. The IC design method of claim 1, wherein the wire distance of each two of the flip-flops is a Manhattan distance.

6. The IC design method of claim 1, further comprising:

setting a plurality of weighting numbers each corresponding to the common branch number, the wire distance and the clock skew of each two of the flip-flops; and calculating a weighted sum of the common branch number, the wire distance and the clock skew of each two of the flip-flops to calculate the cost of each two of the flip-flops.

7. A non-transitory computer readable medium that comprises a plurality of computer readable commands, wherein the computer readable commands are executed by a processor of a computer system to execute an IC design method, the IC design method comprising:

retrieving a clock tree structure comprising a plurality of flip-flops and a plurality of clock units from an IC design file;

using the flip-flops as starting points, determining a branch level number of a branch that each of the clock units in the clock tree structure locates relative to the flip-flops;

calculating the branch level number of a common branch that closest to each two of the flip-flops as a common branch level number;

retrieving a scan chain structure of the flip-flops from the IC design file;

determining a wire distance and a clock skew of each two of the flip-flops according to the scan chain structure;

calculating a cost of each two of the flip-flops according to the common branch number, the wire distance and the clock skew of each two of the flip-flops;

determining an initial point and a terminal point of the flip-flops in the scan chain structure according to the scan chain structure to further calculate a path having a minimum cost of the flip-flops from the initial point to the terminal point according to the cost of each two of the flip-flops; and updating a connection order of the scan chain structure of the IC design file according to the path.

8. The non-transitory computer readable medium of claim 7, wherein the step of calculating the path having the minimum cost of the flip-flops further comprises:

disposing each of the flip-flops as one of a plurality of nodes of a graph theory model to set the cost of each two of the flip-flops as a line between each two of the nodes; and calculating the path having the minimum cost of the flip-flops from the initial point to the terminal point on the graph theory model.

9. The non-transitory computer readable medium of claim 7, wherein the IC design method further comprises:

determining two of the flip-flops having a fixed order according to the scan chain structure; and setting the cost of the two of the flip-flops having the fixed order as infinitely large relative to the other flip-flops.

10. The non-transitory computer readable medium of claim 7, wherein the IC design method further comprises:

setting a plurality of weighting numbers each corresponding to the common branch number, the wire distance and the clock skew of each two of the flip-flops; and calculating a weighted sum of the common branch number, the wire distance and the clock skew of each two of the flip-flops to calculate the cost of each two of the flip-flops.

* * * * *